United States Patent
Archibald et al.

(10) Patent No.: US 7,235,274 B2
(45) Date of Patent: Jun. 26, 2007

(54) DOUGH COMPOSITION PACKAGED IN FLEXIBLE PACKAGING WITH CARBON DIOXIDE SCAVENGER AND METHOD OF PREPARING

(75) Inventors: William E. Archibald, Atascadero, CA (US); David A. Kirk, Coon Rapids, MN (US)

(73) Assignee: General Mills Marketing, Inc., Minneapolis, MN (US)

(*) Notice: Subject to any disclaimer, the term of this patent is extended or adjusted under 35 U.S.C. 154(b) by 222 days.

(21) Appl. No.: 10/273,668

(22) Filed: Oct. 16, 2002

(65) Prior Publication Data

US 2004/0076722 A1  Apr. 22, 2004

(51) Int. Cl.
- *A21D 2/02* (2006.01)
- *A21D 8/02* (2006.01)
- *A21D 10/02* (2006.01)

(52) U.S. Cl. .................. 426/128; 426/395; 426/551
(58) Field of Classification Search .............. 426/118, 426/128, 108, 127, 395, 411, 330, 551; 428/330
See application file for complete search history.

(56) References Cited

U.S. PATENT DOCUMENTS

| | | | |
|---|---|---|---|
| 3,767,421 A | 10/1973 | Gulstad et al. | |
| 4,366,179 A | 12/1982 | Nawata et al. | |
| 4,552,767 A | 11/1985 | Saleeb et al. | |
| 4,741,907 A * | 5/1988 | Furuhashi | 426/90 |
| 5,322,701 A | 6/1994 | Cullen et al. | |
| 6,037,022 A | 3/2000 | Adur et al. | |
| 6,039,994 A * | 3/2000 | LeFlecher et al. | 426/498 |
| 6,261,613 B1 | 7/2001 | Narayanaswamy et al. | |
| 6,395,195 B1 | 5/2002 | Evans et al. | |
| 6,451,423 B1 | 9/2002 | Armat et al. | |

FOREIGN PATENT DOCUMENTS

| | | |
|---|---|---|
| CN | 1256882 | 6/2000 |
| EP | 0176371 | 3/1989 |
| FR | 2829684 | 3/2003 |
| JP | 55059825 | 5/1980 |
| JP | 61183371 A * | 8/1986 |
| JP | 63007744 | 1/1988 |
| JP | 01171430 | 7/1989 |
| JP | 03014480 | 1/1991 |
| JP | 3085265 | 4/1991 |
| JP | 03085265 | 4/1991 |
| JP | 03198741 | 8/1991 |
| JP | 03224454 | 10/1991 |
| JP | 04008248 | 1/1992 |
| JP | 04104753 | 4/1992 |
| JP | 5236861 | 9/1993 |
| JP | 08256703 | 3/1995 |
| JP | 07274879 | 10/1995 |
| JP | 11018791 | 7/1997 |
| JP | 10191893 | 7/1998 |
| JP | 2000125795 | 5/2000 |
| RU | 2156737 C1 | 9/2000 |
| WO | WO99/14287 | 3/1999 |
| WO | WO00/78165 | 12/2000 |

OTHER PUBLICATIONS

Encyclopedia of Polymer Science and Technology. vol. 11. John Wiley and Sons. 1969.*
Vermeiren, L., et al., 1999, *Developments in the Active Packaging of Foods*, Trends in Food Science and Technology, p. 80, col. 2, Paragraphs 3-4, Table 3.
Rowan, C., 2001, *The Shelf Life challenge*, Food Engineering & Ingredients, Entire Document.

* cited by examiner

*Primary Examiner*—Arthur L. Corbin
(74) *Attorney, Agent, or Firm*—Arlene L. Hornilla; Daniel Schulte

(57) ABSTRACT

Described is a packaged dough product comprising a dough composition in a flexible package and including encapsulated basic chemical leavening agent and non-encapsulated acidic chemical leavening agent, the packaged dough product containing a carbon dioxide scavenger to reduce bulging of the packaged product during storage.

35 Claims, 2 Drawing Sheets

DOUGH COMPOSITION PACKAGED IN FLEXIBLE PACKAGING WITH CARBON DIOXIDE SCAVENGER AND METHOD OF PREPARING

FIELD OF THE INVENTION

The invention relates to packaged dough products and methods for preparing the same, wherein the packaged dough product includes a carbon dioxide scavenger.

BACKGROUND

Unproofed (i.e., unleavened) dough compositions, whether they are designed to leaven by effects of yeast prior to baking or by effects of chemical leavening systems during baking, can evolve carbon dioxide prior to desired leavening, during storage at frozen or refrigerated temperatures. Many unproofed dough products are conveniently and economically packaged in flexible packaging for refrigerated or frozen storage. When packaged in substantially air tight flexible packaging, carbon dioxide produced by the dough composition can build inside the interior space of the packaging to cause the packaging to bulge, leading consumers to consider the product to be undesirable.

Different attempts have been discussed to solve the problem of flexible package bulging. One example is the use of a gas release valve to release gas buildup inside of a flexible package.

Another example specific to chemically leavened dough products is to attempt to prevent premature reaction of chemical leavening agents by their encapsulation. This solution is not perfect, because even though premature reaction of chemical leavening agents may be reduced or minimized, it may not be possible or preferable to completely prevent exposing a chemical leavening agent to a bulk dough composition during storage, or to completely prevent premature reaction of chemical leavening agents.

Chemical leavening systems generally include two chemical leavening agents, typically an acid and a base, that chemically react to produce carbon dioxide that leavens and expands (or "proofs") the dough, preferably during baking. While chemical leavening systems can be designed to react during baking, these components, in a dough composition, can sometimes react prematurely, at least to some degree, causing premature gas release and premature expansion of the dough composition. Encapsulated chemical leavening agents are known generally and include particles that contain particulates of solid chemical leavening agent coated or contained in a barrier material such as a room temperature solid fat. When encapsulated particles are included in a dough composition, however, incomplete or imperfect encapsulation of chemical leavening agent particulates, or damage to encapsulated particles, can still allow premature contact between the chemical leavening agents and premature release of carbon dioxide.

There is continuing need for packaged dough products and methods for their preparation, which reduce or eliminate bulging of the packaging due to carbon dioxide evolution from the dough composition.

SUMMARY

The invention relates to the use of carbon dioxide scavengers in a packaged, unproofed dough product, to prevent bulging of flexible packaging. It has been determined that carbon dioxide scavengers can be used to absorb amounts of carbon dioxide released by unproofed dough compositions during cold storage, to prevent package bulging. The scavenger may be included in the packaged dough product in the form of a separate component such as a patch or sachet placed inside the package, or in the form of a scavenger material being included on or within a layer of a packaging material. As an example of the latter, a scavenger can be included as a filler or a suspended material in a polymeric matrix that is a part of a flexible packaging material of the packaged dough product. As another example, scavenger can be placed at an interior surface of a flexible packaging material, such as in the form of a coating that consists of or contains the scavenger.

In a particular embodiment of the invention, the dough composition can be a refrigerator stable, chemically leavenable (i.e., "chemically leavened") dough composition. A "chemically leavened" dough composition means that during baking, the unproofed dough becomes leavened due to a leavening gas (e.g., carbon dioxide) produced by a reaction between chemical leavening agents, typically an acid and a base. An embodiment of the invention relates to the particular determination that amounts of carbon dioxide prematurely evolved by refrigerator stable, chemically leavened dough compositions can be absorbed by carbon dioxide scavenger to reduce or substantially prevent package bulging. Preferred carbon dioxide scavengers include metal oxides and metal hydroxide materials.

Even more specifically, certain embodiments of the invention contemplate packaged chemically leavened dough compositions that are refrigerator stable, evolving low amounts of carbon dioxide during refrigerated storage, e.g., chemically leavened dough compositions that evolve less than approximately 70 cubic centimeters (cc) of carbon dioxide per 126 grams (g) of dough composition over 12 weeks at refrigerated storage temperature (e.g., 45 degrees Fahrenheit), preferably less than 50 cc or 40 cc of carbon dioxide per 126 g of dough over 12 weeks at 45 degrees Fahrenheit.

In these and other embodiments of the invention, an amount of carbon dioxide scavenger needed to react with enough evolved carbon dioxide to prevent package bulging can be included in the packaged dough composition, preferably incorporated into or placed or coated on a flexible packaging material, in an amount and location effective to reduce or prevent substantial bulging of the flexible packaging. (Not all of the evolved carbon dioxide needs to be absorbed.) Examples of packaging according to the invention include flexible packages for dough compositions that include carbon dioxide scavenger present within a layer at the interior of the packaging, e.g., as a printed pattern.

As another advantage of the present packaged dough products, use of low pressure packaging can make it easier to package fewer portions of a dough composition, e.g., biscuits, per container, which can add an element of portion control to preferred packaged dough compositions of the invention. For example, a packaged dough product may include multiple portions of dough compositions packaged in a number of sub-divided units, e.g., a number of packages of 1, 2, or 3 portions (e.g., biscuits), packaged to be substantially air tight, but still not pressurized, and packaged according to the invention to include a carbon dioxide scavenger to reduce or prevent bulging of the individual sub-divided packages. More than one of the sub-divided packaged units containing 1 or multiple portions (e.g., biscuits) can be included in a larger, non-pressurized package. According to the invention, multiple sub-divided packages of dough compositions can be packaged to include one or more dough composition portions and carbon dioxide scavenger, e.g., using preferred multi-layer packaging as described herein. Those packaged portions can be included in a larger package, e.g., a bag or a cardboard box, and each of the sub-divided packages can be removed, opened, and used separately. The remaining sub-divided portions remain packaged for later use.

An aspect of the invention relates to a packaged dough product comprising an unproofed dough composition within substantially air-tight flexible packaging, wherein the dough product contains carbon dioxide scavenger to reduce bulging of the packaging caused by carbon dioxide evolution from the unproofed dough composition.

Another aspect of the invention relates to a packaged dough product comprising unproofed chemically leavenable dough composition within low pressure, substantially air-tight flexible packaging. The dough composition is a chemically leavenable dough composition comprising encapsulated basic chemical leavening agent and non-encapsulated acidic chemical leavening agent. The packaging material comprises carbon dioxide scavenger in a polymeric matrix.

Still another aspect of the invention relates to a method of preparing a packaged dough composition. The method comprises providing a dough composition, and packaging the dough composition in a low pressure package comprising carbon dioxide scavenger.

Yet another aspect of the invention relates to a refrigerated or frozen packaged dough product comprising a dough composition in a multilayer flexible film packaging material. The multilayer flexible film packaging material comprises at least first and second layers, the first layer being gas impermeable, the second layer comprising a carbon dioxide scavenger.

As used with respect to the present description, the term "refrigeration-stable" means that a dough composition undergoes sufficiently little leavening during refrigerated storage to be a useful commercial or consumer dough product, e.g., there is not an excessive amount of leavening gas (e.g., carbon dioxide) production during storage. For example, the raw specific volume (RSV) remains at an acceptable level, such as from 0.9 to 1.6 cc/gram, or, the dough composition evolve less than approximately 70 cubic centimeters (cc) of carbon dioxide per 126 grams (g) of dough composition over 12 weeks at refrigerated storage temperature (e.g., 45 degrees Fahrenheit), preferably less than 50 cc or 40 cc of carbon dioxide per 126 g of dough over 12 weeks at 45 degrees Fahrenheit.

The term "unproofed" refers to a dough composition that has not been processed to include any step intended to cause proofing or intentional leavening of a dough composition. For example, a dough composition may not have been subjected to a specific holding stage for causing the volume of the dough to increase by 10% or more. The raw specific volume (RSV) of an unproofed dough composition can typically be in the range from about 0.75 to about 1.6 cubic centimeters per gram.

DETAILED DESCRIPTION

Figure 1:
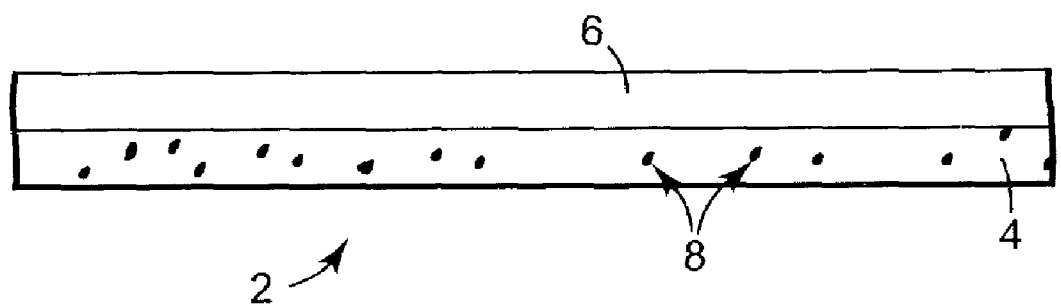
FIG. 1 illustrates a side view of an embodiment of a multilayer flexible packaging material that includes a carbon dioxide scavenger layer.

The invention involves the use of a carbon dioxide scavenger with unproofed dough compositions contained in flexible packaging.

Generally, the dough composition can be any dough composition that evolves carbon dioxide during refrigerated or frozen storage. When packaged in flexible packaging and stored at refrigerated or frozen storage conditions, yeast-leavened and chemically-leavened dough compositions can produce carbon dioxide that can cause the flexible packaging to bulge. According to the invention, the packaged dough product includes a carbon dioxide scavenger that reacts with the carbon dioxide to form a lower volume reaction product, thereby preventing buildup of carbon dioxide gas in the package, and reducing or preventing substantial packaging bulge.

Useful scavengers can include metal oxides and metal hydroxides. A metal oxide can react with water to produce a metal hydroxide. The metal hydroxide can react with carbon dioxide to form water and a metal carbonate that will not cause the flexible packaging to bulge.

As an example, if the scavenger contains calcium oxide, water (present in the packaging from the dough composition) reacts with the calcium oxide to produce calcium hydroxide:

$$CaO+H_2O \rightarrow Ca(OH)_2$$

Thereafter the calcium hydroxide reacts with carbon dioxide evolved from the dough composition to yield calcium carbonate and water:

$$Ca(OH)_2+CO_2 \rightarrow CaCO_3+H_2O$$

While calcium oxide and calcium hydroxide can be preferred as the carbon dioxide scavenger, other metal oxides and metal hydroxides such as magnesium oxide and barium oxide may also be used. The reactions with magnesium and barium are analogous to those with calcium, as indicated above. Alternatively, potassium oxide ($K_2O$) and sodium oxide ($Na_2O$) can be used. The reactions are analogous to those for calcium oxide, as shown above. The reactions are:

$$Na_2O+H_2O \rightarrow 2Na(OH)$$

or $$K_2O+H_2O \rightarrow 2K(OH)$$

Thereafter the hydroxides combine with $CO_2$ as follows:

$$2NaOH+CO_2 \rightarrow Na_2CO_3+H_2O$$

or $$2KOH+CO_2 \rightarrow K_2CO_3+H_2O.$$

Useful carbon dioxide scavenger and packaged dough products of the invention may include other components to prevent or reduce package bulging, such as moisture producing or moisture retaining agents, hydrating agents, desiccants, hygroscopic agents, anhydrous materials, etc., (see, e.g., EP 0176371 B1 and U.S. Pat. Nos. 5,322,701 and 6,451,423 B1), but this is not necessary. Therefore, the scavenger may consist of or consist essentially of a metal oxide or metal hydroxide as described, and the packaging material and packaged dough products of the invention may include no other moisture producing or moisture retaining agents to prevent package bulging other than the conventional dough ingredients and dough packaging materials.

According to the invention, the dough composition is preferably packaged in a low pressure container, meaning that the packaging is substantially air tight (it will bulge if a gas such as carbon dioxide builds inside the packaging) but otherwise does not create a pressurized interior space. The packaging material does not require a pressure relief valve.

The packaging is also flexible. A substantially air tight flexible packaging can be prepared from materials such as paper or polymeric materials, such as polymeric (e.g., plastic) film. A polymeric film may be prepared from generally well known packaging material polymers such as different polyesters (e.g., PET), nylons, polyolefins (e.g., polyethylene), vinyls, polyalcohols, etc. A flexible packaging film may include only one or multiple layers, including two or more different layers that perform different functions including layers that act as a support layer, an oxygen barrier layer, a scavenger layer (polymer that includes scavenger), or a sealant layer. A sealant can be a low temperature melt point polymer used to seal a package closed. A sealant layer is typically an interior layer of a packaging film and is sealed using time, elevated temperature, and pressure, to form the finished closed packaged product (e.g., pouch). An example of a useful material for a sealant layer is LDPE (low density polyethylene)/EVA (ethylene vinyl acetate) copolymer. A sealant layer may also contain scavenger.

The thickness of a single or multilayer packaging film, or a layer of a multilayer packaging film, can be sufficient to perform the intended function of the layer, such as to function as a support layer, as an oxygen barrier layer, as a scavenger layer, or as a sealant layer, respectively.

Carbon dioxide scavenger can be included in the packaged dough product as a separate component such as a patch or a sachet that allows the scavenger to contact carbon dioxide evolved by the dough composition.

In preferred embodiments, carbon dioxide scavenger can be included in or placed (e.g., coated) on one or more layers of a single or multiple layer packaging film, with the scavenger being present in an amount and location such that the scavenger can contact and react with carbon dioxide evolved from the dough composition contained in the package. This means, for example, that scavenger can be suspended or otherwise included in a polymeric film, for example, where the polymeric film is part of a layer of a single layer or a multilayer packaging film. As an example, scavenger can be present as filler in a polymeric matrix of a packaging film. See, for example, U.S. Pat. No. 6,451,432, which describes flexible films that contain carbon dioxide scavenger materials.

Alternatively, scavenger could be included at a surface of a packaging film as a coating, e.g., a polymeric or non-polymeric coating. In certain embodiments, scavenger can be placed at a surface of a packaging material by coating scavenger or a material that includes scavenger on a surface of the film that will be present at the interior of the package.

If scavenger is present as a coating or part of a coating at an interior surface of a packaging material, the scavenger can be coated in any manner, e.g., as a pattern such as a printed colored graphic, alphanumeric, or other type of colored or contrasting pattern at an interior of the packaging but that shows through to the exterior of the package. Coating can be accomplished by any of a variety of well understood coating methods, such as by spraying, pattern printing, roll or die printing, or screen printing a solution that contains scavenger onto a surface of a flexible packaging material. The coating may be colored or colorless, discontinuous, continuous, or substantially continuous in the form of a solid, un-patterned coating. Or, the coating may be in the form of letters or patterns of coated material such as a water or solvent-based colored or ink material coated on an interior surface of the packaging to be exposed to the interior of the packaged dough product, where the coating may show through as graphics or lettering visible at the exterior of the packaging.

FIG. 1 illustrates an example of a multilayer flexible packaging film for use according to the invention. Film 2 includes multiple layers (two layers as illustrated). At least one of the layers, layer 4 as illustrated, includes carbon dioxide scavenger. Layer 4 can be a polymeric layer that contains particles 8 of suspended carbon dioxide scavenger, as illustrated. The other layer, layer 6, can be any suitable flexible packaging material, such as a polymeric material. Preferably, layer 6 can be a barrier material, e.g., a polymeric material that prevents passage of liquid or gaseous materials such as liquid or gaseous moisture or gaseous oxygen. Scavenger layer 2 can be incorporated into a packaged dough product so the scavenger is available to contact carbon dioxide evolved from a dough composition—this may mean that layer 2 is at or toward the interior surface of a packaged dough product, toward the dough composition. A barrier layer such as barrier layer 6 will be at or toward the exterior of the packaged dough product compared to scavenger layer 4. The multilayer flexible packaging film 2 of FIG. 1 is illustrated as having only two layers, but more layers can be useful as well. Other polymeric layers, for example, placed in useful arrangement compared to the scavenger layer, may be useful for selected functions, such as to provide desired mechanical properties or as a sealant layer. Additionally, printing or graphics may be added to a layer of the film or to one or more surfaces of the film.

Figure 2:
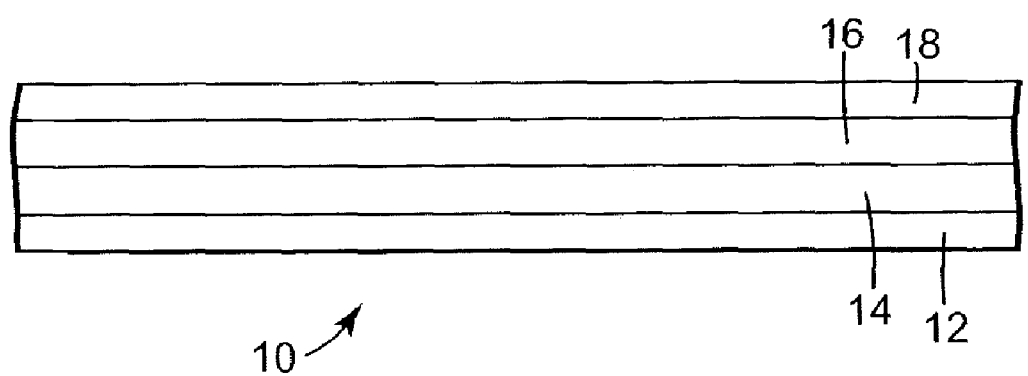
FIG. 2 illustrates a side view of an embodiment of a multilayer flexible packaging material that includes a carbon dioxide scavenger layer.

FIG. 2 illustrates another embodiment of a useful multilayer film. FIG. 2 shows film 10 that includes a sealant layer 12 (to be place at an interior of a packaged dough composition), scavenger layer 14, oxygen barrier layer 16, and polymeric layer 18 (e.g., for support and mechanical properties). Sealant layer 12 is at least partially permeable to carbon dioxide, so carbon dioxide can reach scavenger layer 14. Printing or graphics may be added to a layer of the film or to one or more surfaces of the film.

Figure 3:
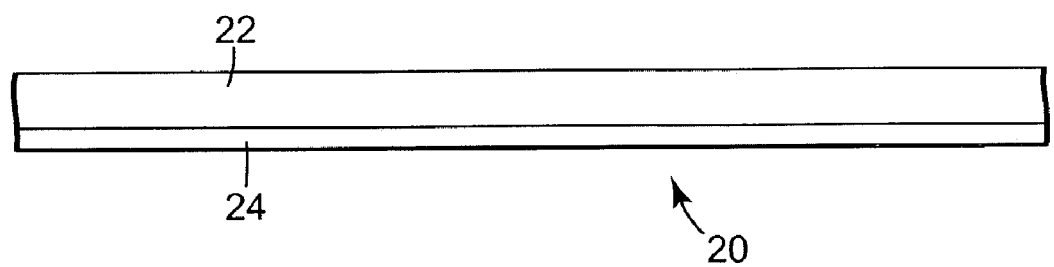
FIG. 3 illustrates a side view of an embodiment of a multilayer flexible packaging material.

FIG. 3 illustrates still another embodiment of a useful packaging film according to the invention. Flexible film 20 includes film 22, which may contain a single polymeric layer or multiple layers such as a polymeric oxygen barrier (e.g., PVCD or EVOH) and a mechanical support layer (e.g., polyester or nylon). At a surface of the film is a coated layer or coating 24 (location at the interior of a packaged dough product, near the dough composition) that can contain, consist of, or consist essentially of carbon dioxide scavenger. The coating may be a coating of only solid (e.g., powdered) carbon dioxide scavenger; a coating of carbon dioxide scavenger in a polymeric matrix; or may be in the form of an ink or other colored or dyed material that contains scavenger and that will show through to the exterior of the film. The coating layer of carbon dioxide scavenger can be coated or printed as a continuous layer (as illustrated), or may be coated in a graphic or alphanumeric pattern, especially if it is to show through to the exterior of the film.

As in all of the figures of the present description, the sizes of layers shown in FIGS. 1, 2, and 3 are not drawn to scale.

Certain presently preferred multi-layer packaging films, as illustrated in FIG. 2, can include materials that include a polyester or nylon layer an oxygen barrier layer; a scavenger layer; and a sealant layer. Examples can comprise, consist of, or consist essentially of four layers: 48 gauge OPET (oriented polyethylene terephthalate)/PVDC (polyvinylidene dichloride) or EVOH (ethyl vinyl alcohol) (as an $O_2$ barrier)/2.0 mil LLDPE (linear low density polyethylene) containing $Ca(OH)_2$ scavenger/sealant layer. Another specific example is a four-layer flexible film comprising, consisting essentially of, or consisting of: nylon (60 gauge=0.0006 inches)/PVDC (polyvinylidene dichloride) or EVOH/LLDPE with scavenger/sealant layer (LDPE/EVA).

An amount of scavenger can be included in the packaged dough product that is sufficient to react with an amount of evolved carbon dioxide to reduce and preferably prevent substantial package bulge. The amount of scavenger needed will depend on various factors such as the location of the scavenger in the film, the type of packaging material and its physical and mechanical properties, the type of scavenger, the type of dough composition, the amount of dough composition contained in a package and the size (volume) of the package, and the amount of carbon dioxide that evolves from the dough composition, etc. Generally, a useful amount of scavenger available within a flexible packaging film can be an amount that is stoichiometrically calculated to sequester a portion of an amount of carbon dioxide expected to evolve from a packaged dough product. It is not necessary that the entire amount of carbon dioxide evolved from a dough composition be reacted, but only enough so that the remaining amount of unreacted carbon dioxide does not cause substantial packaging bulge. When the scavenger is calcium oxide, a stoichiometric amount of calcium oxide to sequester 70 cc of carbon dioxide can be approximately 0.168 grams. Exemplary amounts of scavenger (e.g., calcium oxide) in a packaged dough product can be in the range from 0.05 or 0.10 to 0.50 grams scavenger per 126 grams dough composition, e.g., from 0.15 to 0.35 grams scavenger per 126 grams dough composition. As an example of an amount of scavenger per weight of a packaging film, calcium oxide or calcium hydroxide can be present at up to 40% by weight of a polymeric layer such as a sealant layer, with a sealant layer being approximately 50 to 75% of the weight of the total film structure.

The packaged dough product can include any type or formulation of yeast or chemically leavened dough composition that evolves carbon dioxide during refrigerated or frozen storage. Many if not all formulations of yeast and chemically leavened dough compositions evolve an amount of carbon dioxide during refrigerated or frozen storage. The invention can avoid bulging of such dough compositions packaged in a substantially air tight flexible plastic packaging by including a carbon dioxide scavenger in the packaged dough product, as described.

The invention does not require that any particular type or formulation of dough composition be used in combination with the described packaging and carbon dioxide scavenger system. Still, the inventive use of a carbon dioxide scavenger with the inventive packaging, to avoid bulging, has been found to be particularly useful with certain types of chemically leavened dough compositions, e.g., based on the type of chemical leavening agents included in the dough composition, and based on a relatively low amount of carbon dioxide evolution from such dough compositions during storage.

Preferred chemically leavened dough compositions for use according to the invention can be chemically leavened dough compositions that include encapsulated basic chemical leavening agent, non-encapsulated acidic chemical leavening agent, and that because of on this combination of chemical leavening agents, exhibit a relatively low amount of carbon dioxide evolution during refrigerated storage.

Chemically leavened dough compositions can be prepared from ingredients generally known in the dough and bread-making arts, typically including flour, a liquid component such as oil or water, a chemical leavening system, and optionally additional ingredients such as shortening, salt, sweeteners, dairy products, egg products, processing aids, emulsifiers, particulates, dough conditioners, yeast as a flavorant, flavorings, and the like.

The chemical leavening system generally includes a basic chemical leavening agent and an acidic chemical leavening agent, the two of which react to produce carbon dioxide, desirably during baking, to leaven the dough composition during baking. An amount of the chemical leavening agents can become exposed to each other and react prior to baking, e.g., during refrigerated storage. This premature reaction can be reduced by selecting chemical leavening agents that are of low solubility in the aqueous portion of the dough composition at storage temperature, or by encapsulating one or more of the chemical leavening agents in a material that is solid at storage temperature but that melts or degrades at baking temperature. Preferred dough compositions of the invention include encapsulated basic chemical leavening agent and non-encapsulated, preferably low solubility, acidic chemical leavening agent.

Acidic chemical leavening agents are generally known in the dough and bread-making arts, and include sodium aluminum phosphate (SALP), sodium acid pyrophosphate (SAPP), and monosodium phosphate; monocalcium phosphate monohydrate (MCP), anhydrous monocalcium phosphate (AMCP), dicalcium phosphate dihydrate (DCPD) as well as a variety of others. Commercially available acidic chemical leavening agents include those sold under the trade names: Levn-Lite® (SALP), Pan-O-Lite® (SALP+MCP), STABIL-9® (SALP+AMCP), PY-RAN® (AMCP), and HT® MCP (MCP). These and other examples of acidic chemical leavening agents useful in the compositions are described in Assignee's copending U.S. patent application Ser. No. 09/945,204, filed Aug. 31, 2001, entitled "Chemically leavened Doughs and Related Methods," and in U.S. Pat. No. 6,261,613, the entire disclosures of which are incorporated hereby by reference.

Preferred non-encapsulated acidic agents are slightly soluble in an aqueous phase of a bulk dough composition at processing and refrigeration temperatures. The acidic agent can react with the basic agent only after the acidic agent dissolves in the aqueous phase of a dough composition, so a low solubility prevents reaction of the agents during processing and storage. A higher solubility of the acidic agent is desired at baking temperatures, to allow dissolution and reaction with the basic agent to leaven the dough during baking. Especially preferred acidic chemical leavening agents exhibit slight solubility at processing or refrigerated storage temperatures (e.g. from about 40 to about 55 degrees Fahrenheit) and therefore remain substantially solid during refrigerated storage, up until baking. At higher temperatures (e.g., a temperature that occurs at an early stage of baking, such as a temperature in the range form 100° F. to 200° F., or a temperature at a later stage of baking, such as 300F to 350F), preferred acidic agents become substantially soluble.

Particularly useful acidic chemical leavening agents include SALP and SAPP and those that exhibit solubility behaviors similar to SALP and SAPP (most preferably SALP). SALP and SAPP exhibit low solubilities at comparatively low temperature ranges, such as below about 35–40° C.; however, they have adequate solubilities at higher (e.g., baking) temperatures.

The amount of acidic chemical leavening agent included in a dough composition can be an amount sufficient to neutralize an amount of basic chemical leavening agent during baking, e.g., an amount that is stoichiometric to the amount of basic chemical leavening agent, with the exact amount being dependent on the particular acidic chemical leavening agents that is chosen. A typical amount of acidic agent such as SALP may be in the range from about 0.25 to about 2 parts by weight per 100 parts dough composition, with ranges from about 0.25 to about 1.5 parts by weight per 100 parts dough composition being preferred. In some instances, slightly less than a stoichiometric amount of acid can be used, because less than all of a basic ingredient may dissolve during baking, in which case the amount of acidic agent can match the estimated or expected amount of basic agent available.

Preferred dough compositions of the invention can include encapsulated basic chemical leavening agent. Discussions of encapsulated basic agents are included in Assignee's copending U.S. patent application Ser. No. 09/945,204, filed Aug. 31, 2001, entitled "Chemically leavened Doughs and Related Methods," and in U.S. Pat. No. 6,261,613.

The terms "encapsulated basic chemical leavening agent," "encapsulated basic agent," or simply "encapsulated particles," refer to particles that include solid basic chemical leavening agent particulates covered in part, e.g., substantially completely, by barrier material. Encapsulated particles are known in the baking arts, and include encapsulated particles sometimes referred to as "enrobed" particles, as well as those sometimes referred to as "agglomerated" particles. The barrier material forms a coating or shell around a single or multiple particulates of solid chemical leavening agent, separating the chemical leavening agent from a bulk dough composition. "Enrobed" particles generally include a single particulate of chemical leavening agent covered or coated by barrier material, and "agglomerate" particles generally include 2, 3, or more particulates of chemical leavening agent contained in a mass of barrier material.

Encapsulating the basic chemical leavening agent provides separation between the basis agent and the bulk of the dough composition to inhibit or prevent reaction of the basic and acidic agents until a desired time or condition of processing or use, at which condition the barrier material or encapsulated material degrades and exposes the base to the dough composition. Preferably, during preparation of the dough composition, packaging, and storage of the dough (normally at a refrigerated temperature), the barrier material maintains a separation between the base and acid components and prevents their reaction.

Useful basic chemical leavening agents are generally known in the dough and baking arts, and include soda, i.e., sodium bicarbonate ($NaHCO_3$), potassium bicarbonate ($KHCO_3$), ammonium bicarbonate ($NH_4HCO_3$), etc. These and similar types of basic chemical leavening agent are generally soluble in an aqueous phase of a dough composition at processing or refrigerated storage temperature.

Encapsulated particles containing basic chemical leavening agent and barrier material are generally known, and can be prepared by methods known in the baking and encapsulation arts. An example of a method for producing enrobed particles is the use of a fluidized bed. According to this method, core particulates and barrier material are concurrently introduced into a fluidized bed. As the two materials are present in the fluidized bed, the barrier material becomes coated on the surface of the core particulate. The longer the particulate is present in the fluidized bed, the thicker the coating of barrier material becomes. Typical particles can include 1, 2, or 3 particulates per encapsulated particle.

The amount of a basic chemical leavening agent to be used in a dough composition is preferably sufficient to react with the included acidic chemical leavening agent to release a desired amount of gas for leavening, thereby causing a desired degree of expansion of the dough product. As will be appreciated by the skilled artisan, the individual acidic and basic agents can be included in a dough composition in respective amounts that are useful to leaven the dough composition. The typical amount of a basic chemical leavening agent (not including the weight of barrier material) may be in the range from about 0.25 to about 2 parts by weight per 100 parts dough composition, with ranges from about 0.75 to about 1.5 parts by weight 100 parts dough composition being preferred.

The described combination of slightly soluble acidic agent and encapsulated basic agent having a high degree of encapsulation provide a dough composition that has very good refrigerated storage stability. In terms of expansion of a packaged dough product, with volume gain being a direct result of carbon dioxide outgassing, preferred dough compositions may experience less than 25 percent, e.g., less than 15 percent, and most preferably less than 10 percent volume increase over a period of 5 weeks, 10 weeks, or 12 weeks at 45 degrees Fahrenheit. Also, preferred chemically leavened dough compositions can evolve less than approximately 70 cubic centimeters (cc) of carbon dioxide per 126 grams (g) of dough composition over 12 weeks at refrigerated storage temperature (e.g., 45 degrees Fahrenheit), preferably less than 50 cc or 40 cc of carbon dioxide per 126 g of dough over 12 weeks at 45 degrees Fahrenheit.

Examples of packaged dough products useful according to the invention can include any amount of dough composition, and preferably, the volume of the packaging material is of the same order as the volume of the packaged dough composition. In terms of headspace (volume inside the package that is not taken up by dough composition) for an exemplary packaged dough product, the packaged dough product can contain from about 54 to about 184 cubic centimeters headspace per 126 grams of dough composition, preferably from about 54 to about 94 cubic centimeters headspace per 126 grams dough composition. To avoid substantial packaging bulge, it is desirable that the amount of carbon dioxide evolved by the dough composition, and not reacted by the scavenger, is less than the amount of headspace. Generally if there is less than 30 cubic centimeters of carbon dioxide not reacted with scavenger (per 126 grams dough) (e.g., for a package design in the form of a pouch approximately 3¾"×7¾" with headspace as described above) then the packaged dough product does not experience a substantial amount of packaging bulge (assuming a flat, side-by-side biscuit product arrangement). Volume of evolved carbon dioxide can be determined by measuring package headspace volume (through water displacement of package and product minus the product volume) and measuring the percent carbon dioxide of the headspace gas (e.g., with an instrument such as a dansensor).

A particular embodiment of packaged dough product according to the invention can involve a packaged dough product that contains sub-divided packages containing one or multiple portions of dough composition packaged separately to include carbon dioxide scavenger, wherein the sub-packages are themselves contained together within a larger package to make up the packaged dough product. The smaller packaged dough products use low pressure packaging as described herein, which can make it easier (e.g., as opposed to pressurized cans often used with refrigerated dough products) to package fewer portions of dough composition, e.g., biscuits, in a single package, which in turn allows the advantage of portion control, i.e., less than all portions contained in a packaged dough product may be used together upon opening the packaged dough product.

As an example, a packaged dough product may include one or multiple portions of dough compositions packaged in a number of sub-divided units, e.g., a single packaged dough product may contain multiple smaller packages of 1, 2, or 3 portions of dough composition, with each smaller package being substantially air tight but still not pressurized. The smaller packaged dough product may contain 1, 2, 3, or any other number of dough portions such as a biscuit, that would be convenient for a consumer to use at one time. This number of dough composition portions can be packaged with flexible packaging and according to the invention to include a carbon dioxide scavenger within the package to reduce or prevent bulging of the individual 1 or 2 or 3 portion package. More than one of the smaller packaged units containing 1 or multiple dough composition portions can be included in a larger, non-pressurized package. According to the invention, multiple smaller packages of one or multiple dough composition portions can be packaged to include a carbon dioxide scavenger, e.g., using preferred multi-layer packaging as described herein. The smaller packages of dough composition portions can be included in a larger package, e.g., a cardboard box, and each of the smaller packages can be removed, opened, and the one or multiple portions contained in the package can be used separately from the dough compositions contained in the other smaller packages. The remaining smaller packages of dough composition remain packaged for later use.

Figure 4:
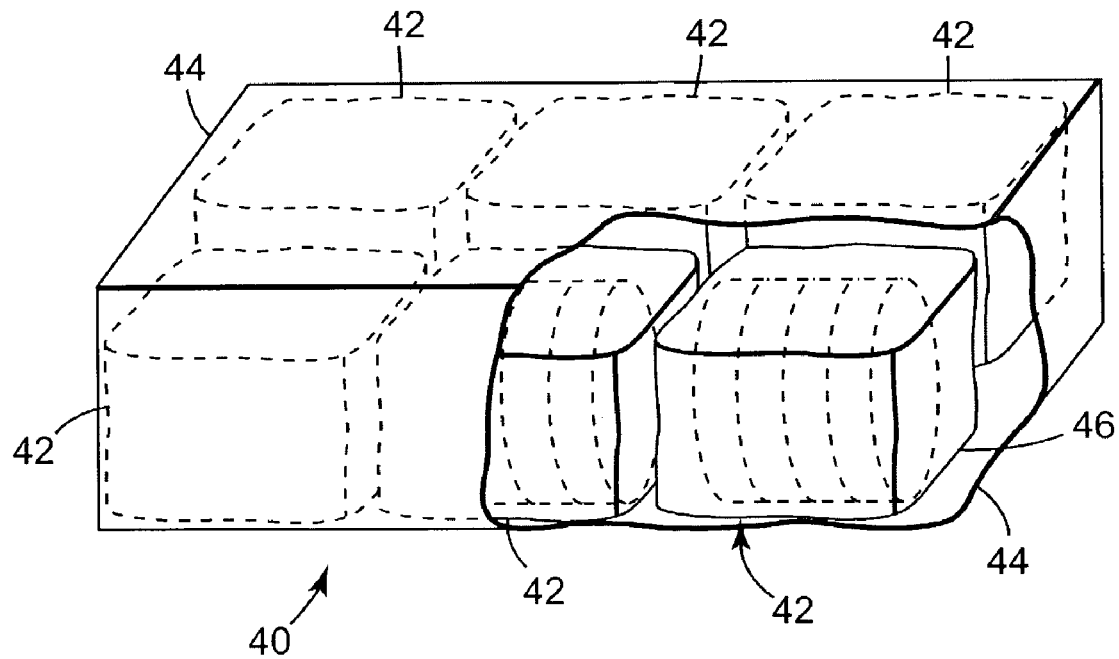
FIG. 4 illustrates a cut away view of an embodiment of a packaged dough product that contains multiple packaged portions of dough composition, each contained in flexible packaging material, and each package including carbon dioxide scavenger, with all of the packaged portions being contained in a larger package for individual sale.

FIG. 4 illustrates an example of a packaged dough product of the invention that can be marketed for individual sale, and that contains sub-divided packaged dough products for separate use. Packaged dough product 40 includes six sub-units of packaged dough products 42, inside of larger package 44. The number of sub-units within the larger packaging 44 can vary as desired, and may be 2, 4, 8, 10, or any other number. While the sub-units 42 are shown to be placed into packaging 44 without support or dividers, a divider may be used to maintain separation between the sub-units 42. Any type of divider may be useful, such as a plastic tray or cardboard inserts. Each sub-unit 42 as illustrated contains 4 portions of a dough composition (e.g., a biscuit). The sub-units may contain more or fewer, depending on factors such as the type of dough composition and convenience. Also, the illustrated biscuits are stacked horizontally but may be arranged in any configuration, e.g., side-by-side. The sub-units are packaged in a flexible film packaging 46, and each package includes carbon dioxide scavenger to prevent bulging. The scavenger may be separate from the flexible film, or may be part of a layer or coating of the flexible film 46, as described herein. Packaging 44 may be made of any useful material such as a rigid cardboard, plastic, or a non-rigid plastic film or paper. The larger package 44 or its packaging material does not need to contain carbon dioxide scavenger other than the amount of scavenger contained in packages of the sub-units 42.

The invention claimed is:

1. A packaged, chemically leavened biscuit dough product comprising an unproofed, chemically leavenable, biscuit dough composition within substantially air-tight flexible packaging, wherein the dough composition comprises encapsulated basic chemical leavening agent and non-encapsulated acidic chemical leavening agent and wherein the dough product contains a carbon dioxide scavenger to reduce bulging of the packaging caused by carbon dioxide evolution from the unproofed dough composition and wherein the dough product, when stored at refrigerator conditions for a time-period of at least 12 weeks, exhibits the following properties:

the flexible packaging exhibits substantially no bulging; and the dough composition has a raw specific volume from about 0.9 to about 1.6 cubic centimeters per gram.

2. The dough product of claim 1 wherein the packaging material comprises a scavenger and a polymer selected from the group consisting of a polyester, a polyolefin, a polyalcohol.

3. The dough product of claim 2 wherein the polymeric material comprises from 0.15 to 0.35 grams calcium oxide scavenger per 126 grams dough composition.

4. The dough product of claim 1 wherein the packaging material comprises a multi-layer film comprising a polyester, a polymeric oxygen barrier, and a polyolefin layer comprising a scavenger.

5. The dough product of claim 1 wherein the packaging material comprises a flexible polymeric material comprising a coating at an interior surface, the coating comprising carbon dioxide scavenger.

6. The dough product of claim 1 wherein the flexible packaging comprises a coating in the form of a pattern, wherein the coating comprises a scavenger.

7. The dough product of claim 6 wherein the pattern comprises a graphic pattern.

8. The dough product of claim 7 wherein the graphic pattern comprises an alphanumeric pattern.

9. The dough product of claim 1 wherein the carbon dioxide scavenger comprises a metal oxide or a metal hydroxide.

10. The dough product of claim 1 wherein the carbon dioxide scavenger comprises calcium oxide.

11. The dough product of claim 1 wherein the dough composition is a refrigerator stable, chemically leavened dough composition.

12. The dough product of claim 11 wherein the dough composition evolves less than 70 cubic centimeters of carbon dioxide per 126 grams of dough composition over 8 weeks while stored at 45 degrees Fahrenheit.

13. The packaged dough product of claim 1 wherein the packaging comprises a multi-layer packaging comprising a sealant layer at the interior of the package, the sealant layer being at least partially permeable to carbon dioxide, and a scavenger layer comprising a polymeric matrix and carbon dioxide scavenger.

14. The packaged dough product of claim 13 wherein the sealant layer comprises a copolymer comprising polyethylene and ethylene vinyl acetate.

15. The packaged dough product of claim 1 wherein the packaging comprises a multi-layer packaging comprising a sealant layer at the interior of the packaging material next to the dough composition, the sealant layer being at least partially permeable to carbon dioxide, an oxygen barrier layer, and a scavenger layer comprising a polymeric matrix containing carbon dioxide scavenger, the scavenger layer being located between the sealant layer and the oxygen barrier layer.

16. The dough product of claim 1, wherein any carbon dioxide evolved from the dough composition during the at least 12 week time-period that has not reacted with the scavenger occupies a volume less than the headspace of the packaged dough product.

17. The dough product of claim 16, wherein the carbon dioxide that has not reacted with the scavenger is less than 30 cubic centimeters per 126 grams of dough.

18. A packaged, chemically leavened biscuit dough product comprising an unproofed chemically leavenable biscuit dough composition within low pressure, substantially air-tight flexible packaging,
wherein the dough composition is a chemically leavenable biscuit dough composition comprising encapsulated basic chemical leavening agent and non-encapsulated acidic chemical leavening agent,
wherein the packaging material comprises carbon dioxide scavenger in a polymeric matrix, and
wherein the dough product when stored at refrigerator conditions for a time-period of at least 12 weeks, exhibits the following properties:
the flexible packaging exhibits substantially no bulging; and
the dough composition evolves less than 70 cubic centimeters of carbon dioxide per 126 grams of dough.

19. The product of claim 18 wherein the scavenger removes enough carbon dioxide from the packaged dough composition so the package does not substantially bulge over 12 weeks of storage at 45 degrees Fahrenheit.

20. The product of claim 19 wherein the dough composition evolves less than 70 cubic centimeters of carbon dioxide per 126 grams of dough over 12 weeks while stored at 45 degrees Fahrenheit.

21. The product of claim 20 wherein the amount of carbon dioxide evolved by the dough composition and not reacted with scavenger is from 10 to 30 cubic centimeters per 126 grams dough composition.

22. The dough product of claim 18, wherein any carbon dioxide evolved from the dough composition during the at least 12 week time-period that has not reacted with the scavenger occupies a volume less than the headspace of the packaged dough product.

23. The dough product of claim 22, wherein the carbon dioxide that has not reacted with the scavenger is less than 30 cubic centimeters per 126 grams of dough.

24. A method of preparing a packaged, chemically leavenable biscuit dough composition, the method comprising
providing a chemically leavenable biscuit dough composition, wherein the dough composition comprises encapsulated basic chemical leavening agent and non-encapsulated acidic chemical leavening agent,
packaging the dough composition in a low pressure package comprising carbon dioxide scavenger, wherein the packaged dough composition when stored at refrigerator conditions for a time-period of at least 12 weeks, exhibits the following properties:
the packaging exhibits substantially no bulging; and
the dough composition has a raw specific volume from about 0.9 to about 1.6 cubic centimeters per gram, and
refrigerating the packaged dough composition.

25. The method of claim 24 wherein
the dough composition evolves an amount of carbon dioxide during refrigerated storage, and
the carbon dioxide scavenger comprises a metal oxide that reacts with water to form a metal hydroxide that reacts with the carbon dioxide to produce water and a metal carbonate.

26. The method of claim 24, wherein any carbon dioxide evolved from the dough composition during the at least 12 week time-period that has not reacted with the scavenger occupies a volume less than the headspace of the packaged dough product.

27. The method of claim 26, wherein the carbon dioxide that has not reacted with the scavenger is less than 30 cubic centimeters per 126 grams of dough.

28. A refrigerated or frozen packaged, chemically leavened dough product comprising a chemically leavenable dough composition in a multilayer flexible film packaging material having a headspace from about 54 to about 184 cubic centimeters per 126 grams of dough composition, wherein the dough composition comprises encapsulated basic chemical leavening agent and non-encapsulated acidic chemical leavening agent and the multilayer flexible film packaging material comprises at least first and second layers,
the first layer being gas impermeable,
the second layer comprising a carbon dioxide scavenger, and
wherein the dough product, when stored at refrigerator conditions for a time-period of at least 12 weeks, exhibits substantially no bulging of the flexible packaging.

29. The product of claim 28 wherein the second layer comprises a polymeric matrix containing carbon dioxide scavenger.

30. The product of claim 28 wherein the second layer comprises a coating comprising carbon dioxide scavenger.

31. The refrigerated or frozen packaged dough product of claim 28 comprising one outer package that contains multiple inner packaged dough products, wherein the inner packaged dough products comprise the dough composition packaged in the multilayer flexible film packaging material.

32. The refrigerated or frozen packaged dough product of claim 31 wherein the dough composition is a chemically leavened biscuit.

33. The refrigerated or frozen packaged dough product of claim 31 wherein the outer package comprises cardboard.

34. A packaged, chemically leavened biscuit dough product comprising an unproofed, chemically leavenable biscuit dough composition within substantially air-tight flexible packaging, wherein:
the dough composition comprises encapsulated basic chemical leavening agent and non-encapsulated acidic chemical leavening agent
the dough product contains a carbon dioxide scavenger to reduce bulging of the packaging caused by carbon dioxide evolution from the dough composition and wherein the dough product, when stored at refrigerator conditions for a time-period of at least 12 weeks, exhibits the following properties:
the flexible packaging exhibits substantially no bulging;
the dough composition has a raw specific volume from about 0.9 to about 1.6 cubic centimeters per gram; and
the package includes headspace from about 54 to about 184 cubic centimeters per 126 grams of dough composition.

35. The dough product of claim 34 wherein the dough composition contains multiple dough pieces.

* * * * *